[19] United States Patent
Hurlburt

[11] Patent Number: 5,046,577
[45] Date of Patent: Sep. 10, 1991

[54] STEERING MECHANISM FOR TRACTORS

[75] Inventor: Joseph C. Hurlburt, Lancaster, Pa.

[73] Assignee: Ford New Holland, Inc., New Holland, Pa.

[21] Appl. No.: 490,245

[22] Filed: Mar. 8, 1990

[51] Int. Cl.[5] .......................... B60K 17/30; B62D 5/26
[52] U.S. Cl. ................................... 180/266; 180/79.4; 180/156; 280/97; 280/98
[58] Field of Search ...................... 180/156, 79.4, 266, 180/144, 155, 158, 159, 160, 162; 280/97, 100, 113, 114, 115, 85, 98

[56] References Cited

U.S. PATENT DOCUMENTS

1,733,544 10/1929 Langdon ........................... 280/97 X
3,027,963 4/1962 Nicholson ......................... 280/97 X
4,771,851 9/1988 Nystuen et al. .................... 180/135

Primary Examiner—Charles A. Marmor
Assistant Examiner—Kevin Hurley
Attorney, Agent, or Firm—Larry W. Miller; Frank A. Seemar; Darrell F. Marquette

[57] ABSTRACT

A steering mechanism for improving the turning radius of a tractor is disclosed wherein the wheels are turned relative to the steering axle simultaneously with a pivotal movement of the steering axle relative to the chassis of the tractor. A connecting link interconnects the pivot mechanism pivotally supporting the steering axle relative to the chassis with the steering mechanism such that a manipulation of the steering mechanism to affect a turning of the wheels affects a pivotal movement of the steering axle in the same direction the wheels are being turned. The pivot mechanism allows for pivotal movement of the steering axle about longitudinally extending horizontal axis in addition to the pivotal movement of the steering axle about a generally vertical axis relative to the chassis. A lost motion linkage interconnecting the pivot mechanism and the steering axle accommodates differences in arcuate movements due to the pivot mechanism and the steering axle pivotally moving about longitudinally spaced pivot centers.

29 Claims, 8 Drawing Sheets

STEERING MECHANISM FOR TRACTORS

BACKGROUND OF THE INVENTION

This invention relates generally to off-road motor vehicles, such as tractors, and more particularly, to a steering mechanism permitting a decreased turning radius for the tractor.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Although supplemental driving power is often provided to the steerable ground engaging wheels, a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse extension of cylinder rod, causing a turning of the wheels.

Due to physical limitations relating to the range of movement of the steering mechanism and to the eventual interference between the steerable wheels and the steering axle, the amount of pivotal movement of the steerable wheels relative to the steering axle is limited to a given turning angle. This maximum turning angle defines the minimum turning radius of the tractor for a given wheel base length and tread spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

These contracting wheel base requirements can be better resolved by a steering mechanism that will decrease turning radius for any given wheel base length, permitting the wheel base length to increase while maintaining established turning radius specifications.

SUMMARY OF THE INVENTION

It is an object of this invention to overcome the aforementioned disadvantages of the prior art by providing a steering mechanism for an off-road vehicle that combines the turning of the steerable ground wheels with a pivotal movement of the steering axle.

It is another object of this invention to decrease the turning radius for an off-road vehicle for a given wheel base length by pivoting the steering axle in the same direction as the steerable ground wheels are turned.

It is a feature of this invention that the steering mechanism may effect a simultaneous pivoting of the ground engaging wheels relative to the steering axle and a pivotal movement of the steering axle relative to the chassis.

It is an advantage of this invention that the wheel base length can be increased without increasing the previously established turning radius specifications.

It is another feature of this invention that the steering axle is pivotally supported relative to the chassis by a pivot mechanism that can be coupled to the steering mechanism to affect simultaneous pivotal movement of the steering axle relative to the chassis.

It is another advantage of this invention that the pivot center for the pivotal movement of the steering axle is positioned at a location that will maintain the spacing between the inside ground engaging wheel and the chassis during maximum turning efforts.

It is another feature of this invention that the wheel base of an off-the-road vehicle can be increased to provide more desirable ride characteristics for the vehicle without changing the turning radius specification of the vehicle.

It is still another object of this invention to provide a pivot mechanism pivotally supporting the steering axle relative to the chassis of the vehicle to enable a pivotal movement of the steering axle about a generally vertical axis, as well as a transverse oscillation of the steering axle about a longitudinally extending, horizontal axis relative to the chassis.

It is still another feature of this invention to provide a lost motion mechanism interconnecting the pivot mechanism and the steering axle to accommodate differences in arcuate movements therebetween during steering operations.

It is a further object of this invention to provide a method of steering an off-the-road vehicle by turning the pivotally mounted steerable ground wheels and the steering axle on which the steerable ground wheels are mounted.

It is yet another feature of this invention that the turning of the steerable ground wheels and the pivoting of the steering axle rotatably mounting the steerable ground wheels can be effected simultaneously.

It is still another advantage of this invention that the steering mechanism can be utilized on various mobile equipment, such as combines, forage harvesters, tractors, and industrial equipment, such as loaders and backhoes.

It is still another feature of this invention that the pivot centers for movement of the pivot mechanism and the pivotal movement of the steering axle are longitudinally spaced in alignment with a longitudinally extending, generally horizontal axis about which the steering axle is mounted for transverse oscillation.

It is a further object of this invention to provide a steering mechanism for an off-the-road vehicle operable to effect a pivotal movement of the steerable wheels relative to the steering axle in which they are mounted simultaneously with a pivotal movement of the steering axle relative to the chassis to decrease the turning radius of the vehicle, wherein the steering mechanism is durable in construction, inexpensive of manufacture, care-free of maintenance, facile in assemblage, and simple and effective in use.

These and other objects, features, and advantages are accomplished according to the instant invention by providing a steering mechanism for improving the turning radius of a tractor wherein the wheels are turned relative to the steering axle simultaneously with a pivotal movement of the steering axle relative to the chassis of the tractor. A connecting link interconnects the pivot mechanism pivotally supporting the steering axle relative to the chassis with the steering mechanism such that a manipulation of the steering mechanism to affect a turning of the wheels affects a pivotal movement of the steering axle in the same direction the wheels are being turned. The pivot mechanism allows for pivotal movement of the steering axle about longitudinally extending horizontal axis in addition to the pivotal movement of the steering axle about a generally vertical axis relative to the chassis. A lost motion linkage interconnecting the pivot mechanism and the steering axle accommodates differences in arcuate movements due to the pivot mechanism and the steering axle pivotally moving about longitudinally spaced pivot centers.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Referring now to the drawings and, particularly, to FIGS. 1-3 and 8, a representative view of a prior art tractor steering mechanism can best be seen. The chassis 10 houses an engine 12 serving to provide operational power for the tractor T, and an operator's cab 14 positioned in an elevated location. The operator's cab 14 includes a steering control 15 conventionally operable to manipulate the steering mechanism 20, 30 described in greater detail below. The chassis 10 is supported above the ground G by a rearward fixed axle 16 having a pair of opposing fixed drive wheels 17 rotatably mounted in a customary transversely spaced orientation. The chassis 10 is also supported above the ground G by a steering axle 18 positioned forwardly of the rearward fixed axle 16. The steering axle 18 is provided with a pair of rotatably mounted steerable wheels 19 pivotally connected to the steering axle 18 to permit a rotational movement relative thereto, as will be described in greater detail below.

Figure 1:
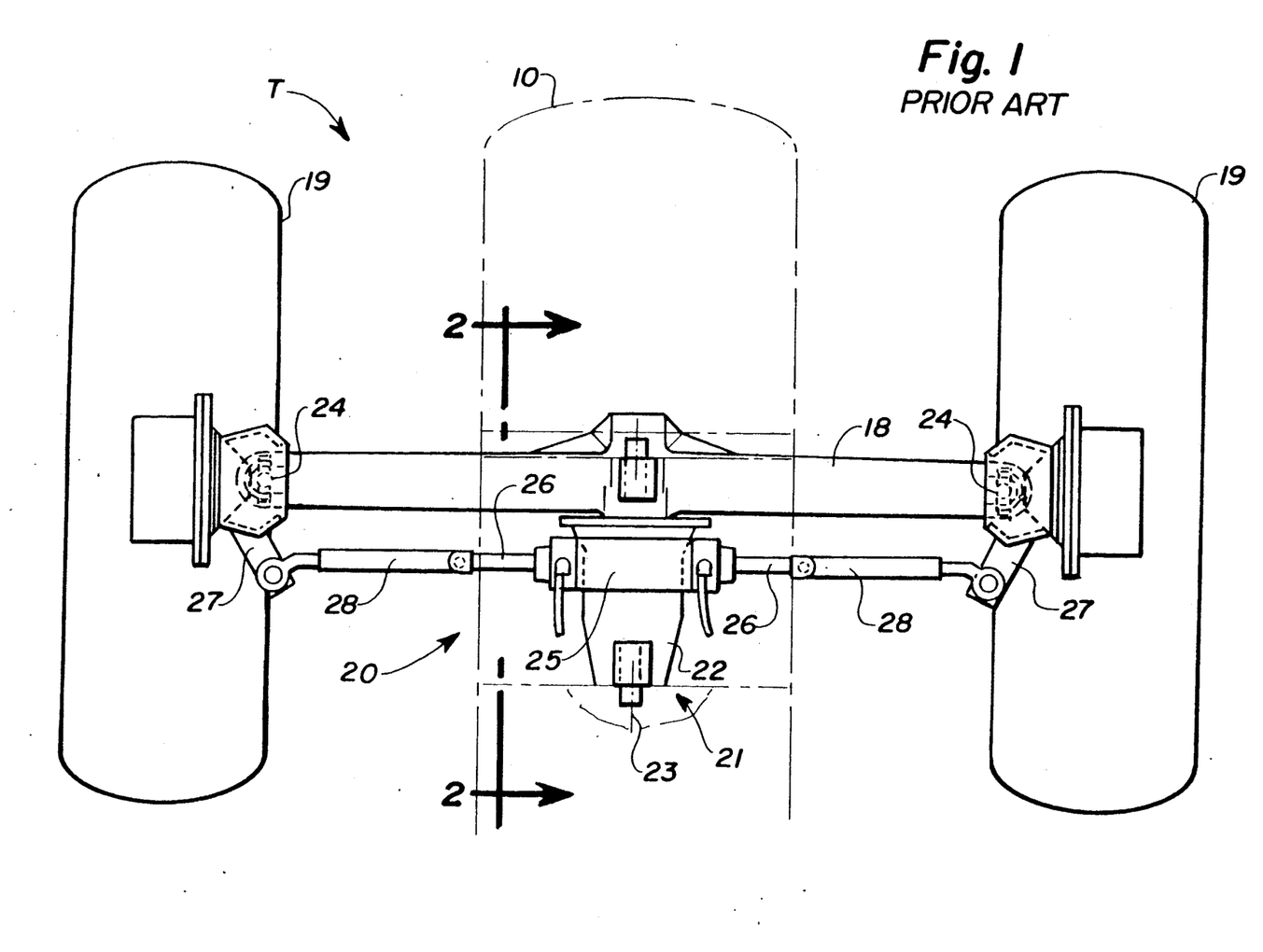
FIG. 1 is a top plan view of the steering axle located at the front portion of a tractor, this top plan view being taken as a cross section below the tractor main frame as indicated by lines 1—1 of FIG. 2, FIG. 1 exhibiting the prior art steering mechanism of a tractor in which the steering axle is mounted for transverse oscillation relative to the chassis, but is otherwise fixed relative thereto.
Figure 2:
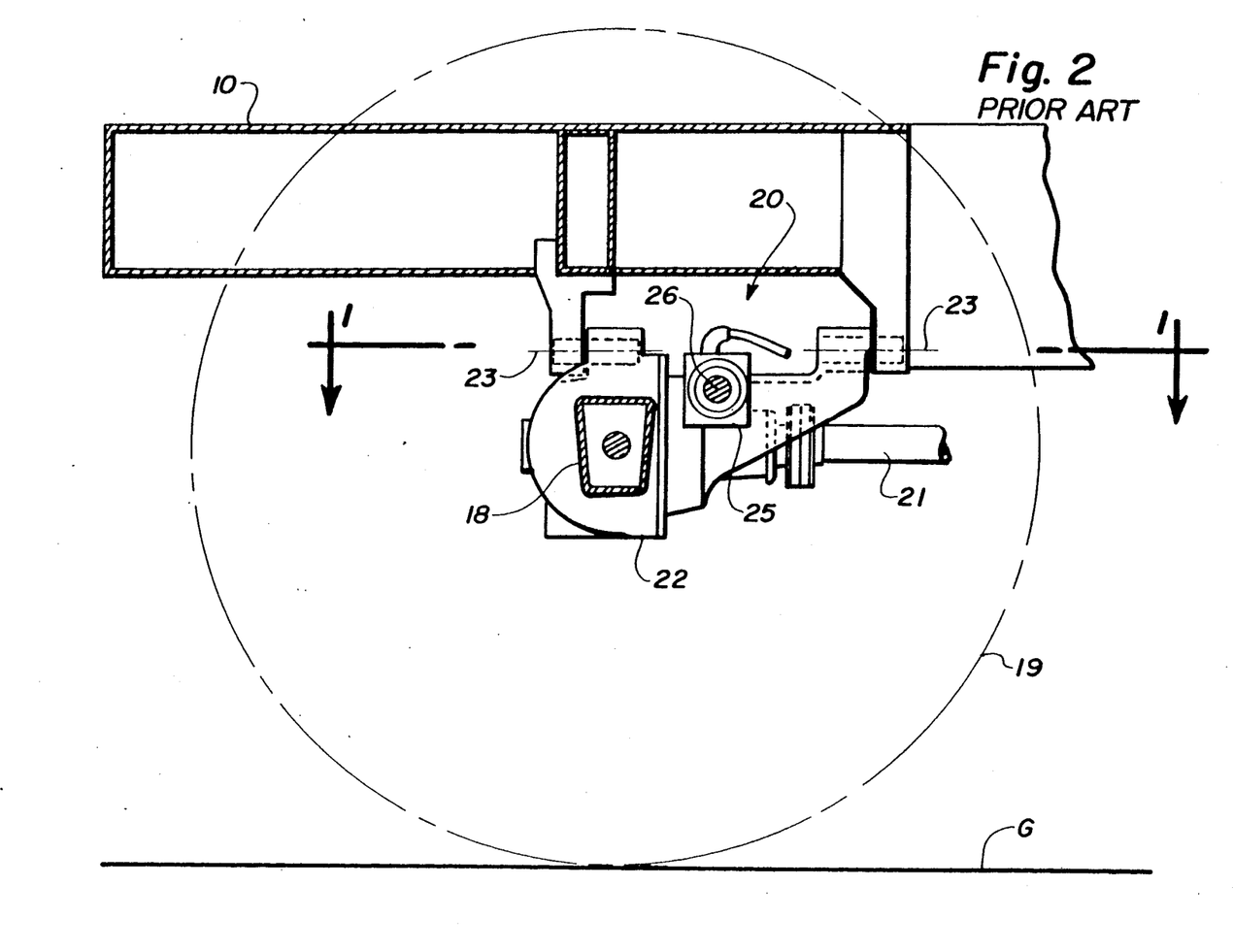
FIG. 2 is a cross sectional view taken along lines 2—2 of FIG. 1 to provide a side elevational view of the prior art steering mechanism.
Figure 3:
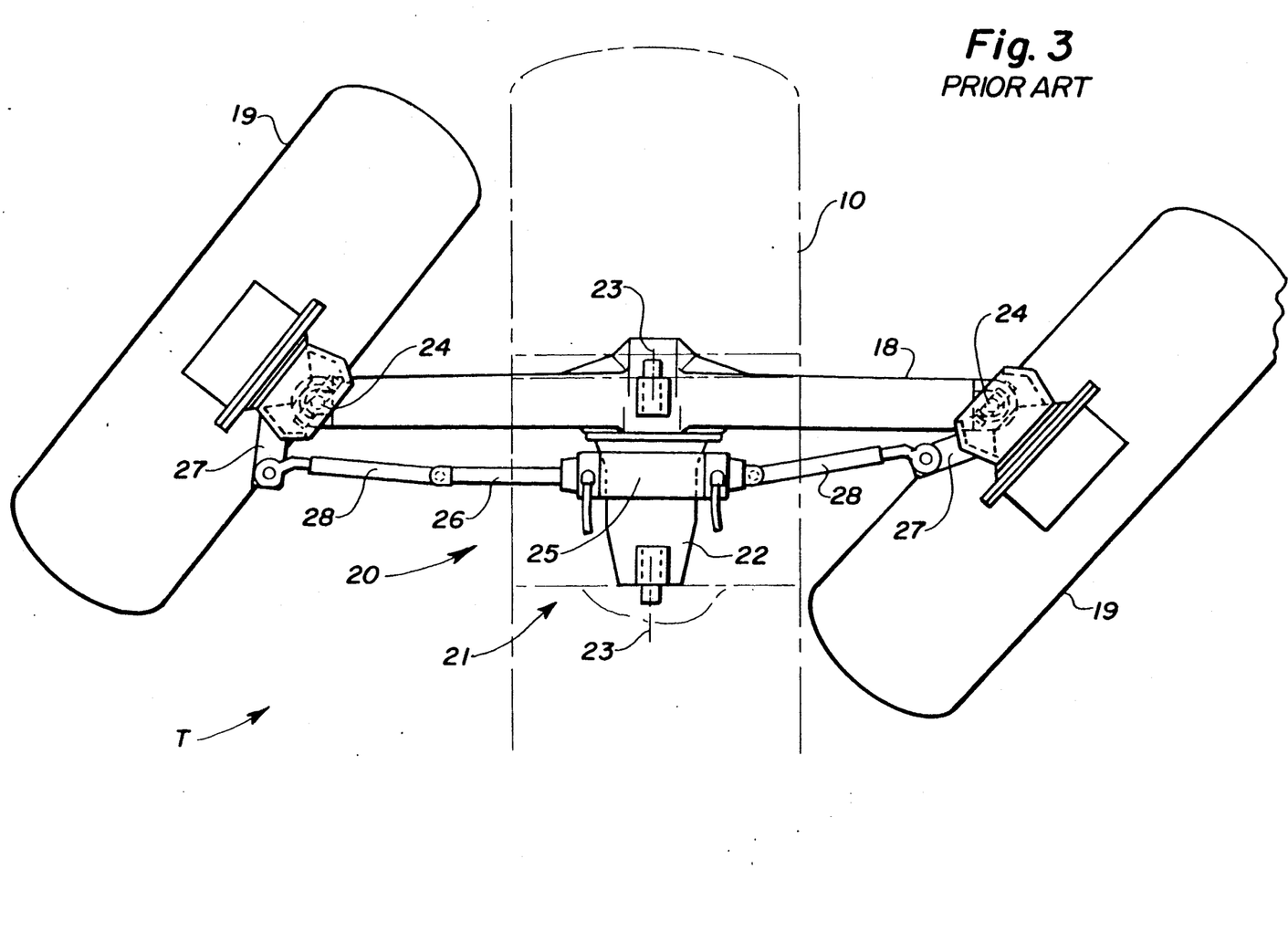
FIG. 3 is a top plan view of the prior art steering mechanism similar to FIG. 1 with the steering mechanism being manipulated to effect a turning of the pivotally mounted steerable ground wheels to cause a right hand turn of the tractor.

Referring to FIGS. 1-3, the prior art steering mechanism 20 can best be seen. Some tractors T are provided with an optional drive mechanism 21 providing rotational power to the steerable wheels 19 in addition to the customary operative driving power applied to the fixed wheels 17. The drive mechanism 21 typically includes a gear housing 22 connected to and supported from the steering axle 18. Both the gear housing 22 and the steering axle 18 are pivotally mounted relative to the chassis 10 for transverse oscillation about a longitudinally extending, generally horizontal pivot axis 23, which permits the steering axle 18 to follow varying ground undulations without disrupting the orientation of the chassis 10.

The steerable wheels 19 are pivotally connected to the transversely opposed ends of the steering axle 18 by a pivot axis commonly referred to as a king pin 24. Each steerable wheel 19 is provided with a fixed steering arm 27 extending outwardly therefrom and pivotable therewith. The steering mechanism 20 further includes a hydraulic cylinder 25 mounted to either the gear housing 22 or the steering axle 18, and oriented in a transverse, horizontal position, generally parallel to the steering axle 18. The hydraulic cylinder 25 is provided with a cylinder rod 26 extending transversely from the body of the cylinder 25 in opposing transverse directions. A steering link 28 interconnects each respective end of the cylinder rod 26 with a corresponding steering arm 27, such that an extension of the cylinder rod 26 in either transverse direction will effect a pivoting of the steerable wheels 19 via a connection of the cylinder rod 26 to the steering arms 27 through the steering links 28, as is best shown in FIG. 3.

Referring specifically to FIG. 3, the interference between respective components of the steering axle 18 and the steerable wheels 19, such as for example, an interference between the steering arms 27 and the axle 18, as well as the interference between the chassis 10 and the pivotally turned steerable wheels 19, limits the amount of pivotal movement of the steerable wheels 19 relative to the steering axle 18. The maximum turning angle exemplified in FIG. 3 defines the minimum turning radius for the tractor T for the given wheel base length between the fixed axle 16 and the steering axle 18. Moving the prior art steering axle 18 forwardly away from the fixed axle 16 to improve ride characteristics of the tractor T will result in an increase of the turning radius for the tractor T because of the length of the increased wheel base and the limitations imposed by the maximum steering angle of the steerable wheels 19.

Figure 4:
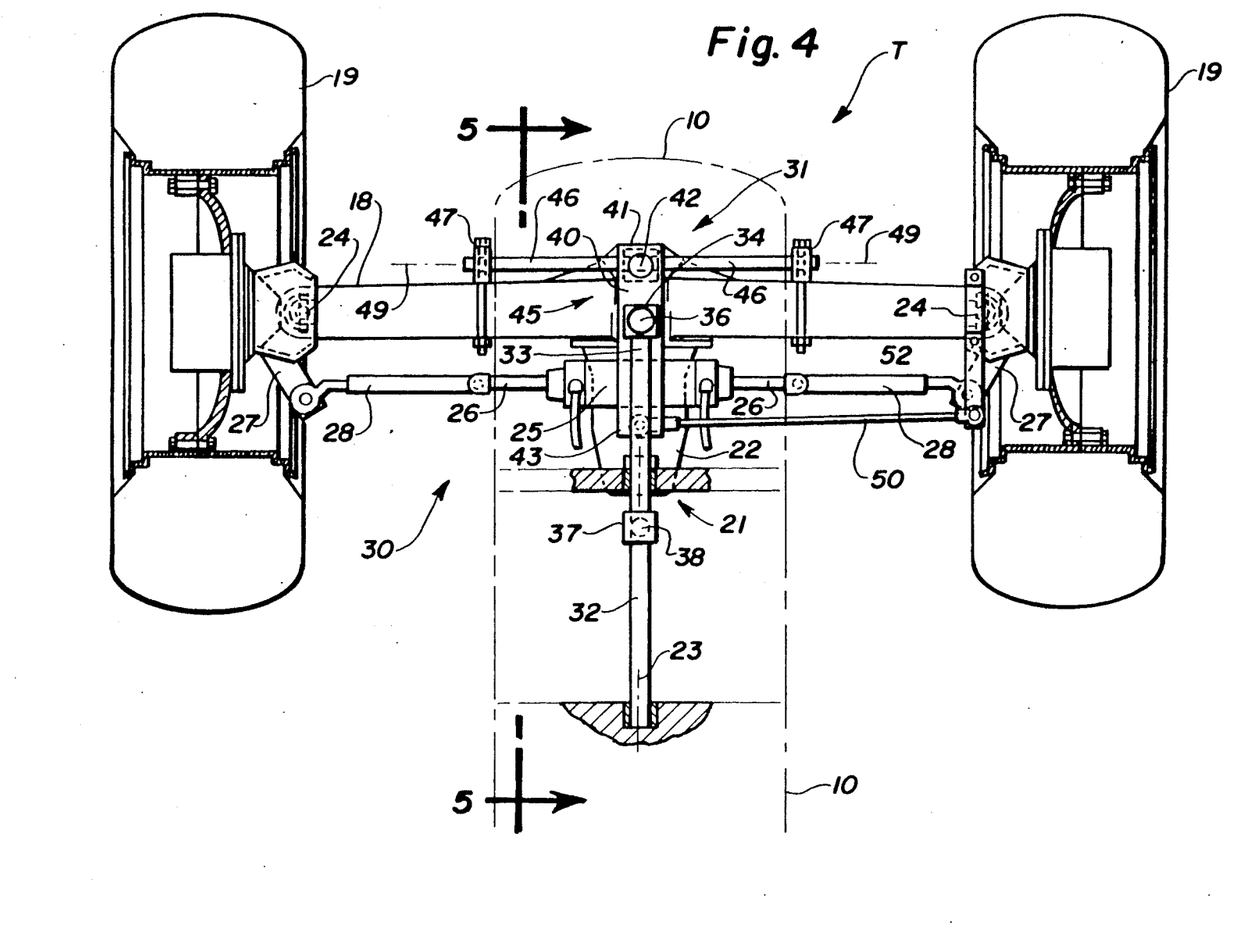
FIG. 4 is a top plan view of the steering mechanism incorporating the principles of the instant invention, FIG. 4 being a view similar to that in FIG. 1, but taken along lines 4—4 of FIG. 5.
Figure 5:
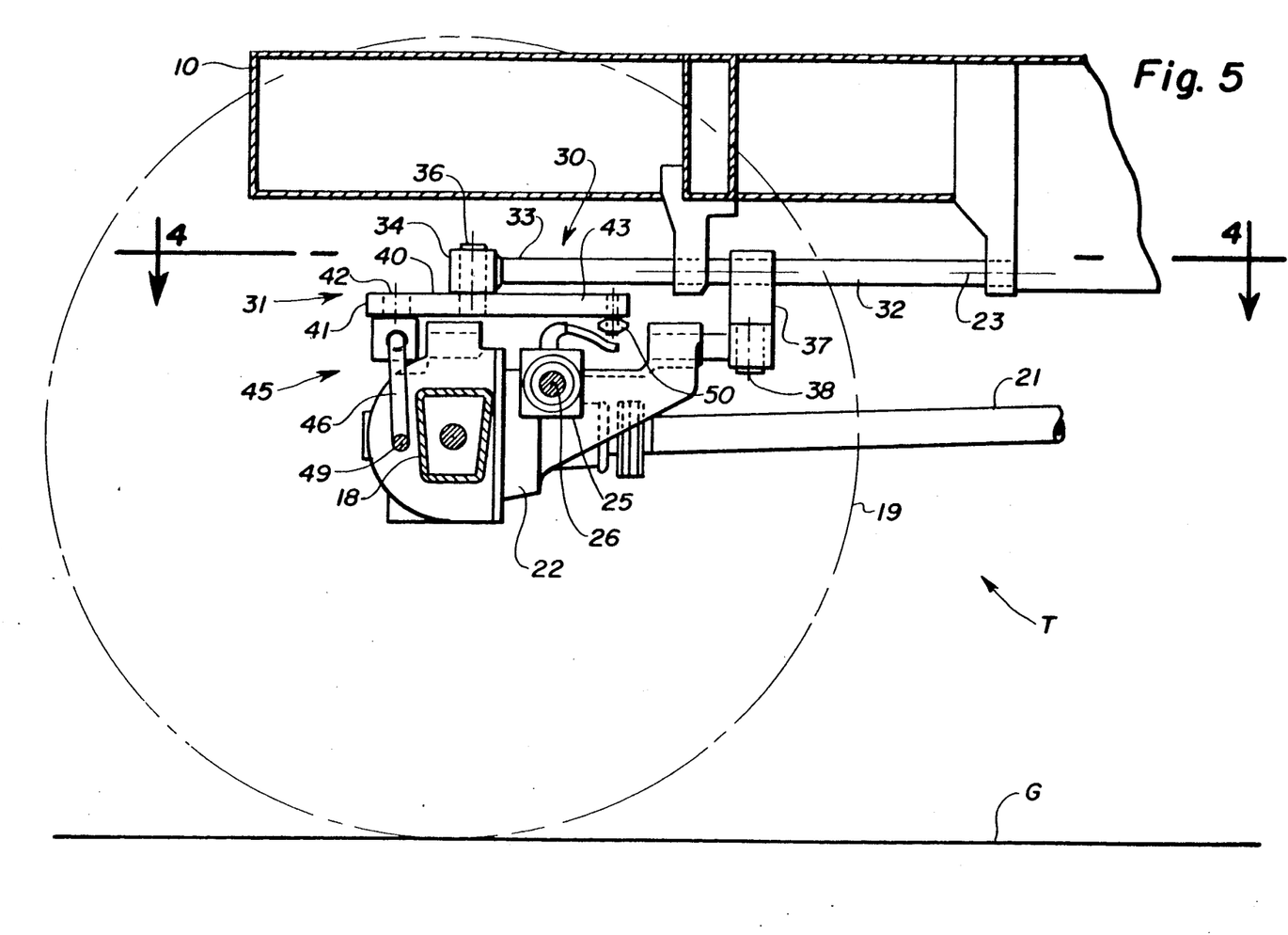
FIG. 5 is a cross sectional view taken along lines 5—5 of FIG. 4 to depict a side elevational view of the steering mechanism incorporating the principles of the instant invention.
Figure 6:
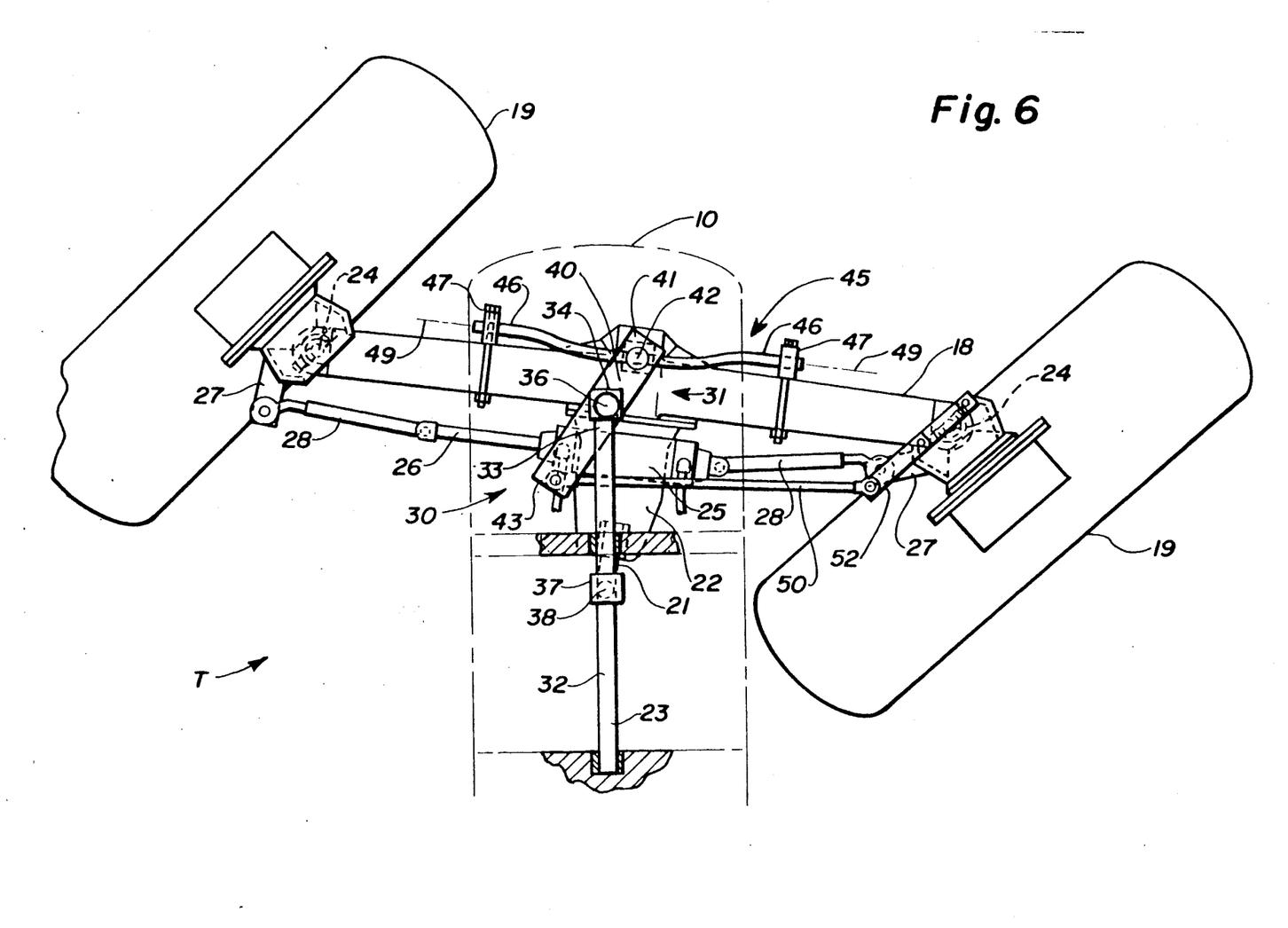
FIG. 6 is a top plan view of the steering axle similar to that of FIG. 4 with the steerable ground wheels being pivoted along with the steering axle into a maximum right turn position.

Referring now to FIGS. 4-6, the principles of the instant invention to provide a decreased turning radius for a given wheel base can best be seen. The steering mechanism 30 utilizes as many of the components of the prior art steering mechanism 20 as possible to minimize complication. The steering axle 18 is pivotally mounted relative to the chassis 10 for pivotal movement about a generally vertical axis 38. To permit the steering axle 18 to transversely oscillate to follow changing ground undulations, the longitudinal pivot axis 23 is defined by a longitudinally extending support shaft 32 extending from and rotatably supported by the chassis 10 and terminating at its forward end 33 in a fixed pivot support 34 adapted to receive a first vertical pivot 36.

A support arm 37 is fixed to the support shaft 32 for pivotal movement therewith about the longitudinal pivot axis 23, The support arm 37 carries a second vertical pivot 38 about which the steering axle 18 is pivotally movable. Accordingly, the entire pivot mechanism 31 pivotally supporting the steering axle 18 relative to the chassis 10 is pivotable about the longitudinal pivot axis 23 with the support shaft 32, thereby permitting transverse oscillations for the steering axle 18. One skilled in the art will readily realize that other arrangements of pivotable components could be devised to permit the steering axle 18 to be capable of transverse oscillations, however, fixing the support arm 37 and the swivel 34 to the support shaft 32 maintains the pivot axes 36, 38 in parallel orientation during transverse oscillatory motions about the longitudinal axis 23.

The pivot mechanism 31 also includes a bellcrank 40 affixed to the first vertical pivot 36 to be rotatable about the axis defined by the pivot 36. The bellcrank 40 terminates in a first, forward end 41 carrying a third vertical pivot 42 for connection to a lost motion linkage 45 and a second, rearward end 43 pivotally connected to a connecting link 50 to effect rotation of the bellcrank 40, as will be described in greater detail below. The lost motion linkage 45 is pivotally connected to the bellcrank 40 at the third vertical pivot 42 and includes transversely extending opposing arms 46 pivotally connected to transversely spaced brackets 47 affixed to the steering axle 18. The pivotal connection between the transverse arms 46 and the brackets 47 defines a transverse horizontal axis 49 about which the lost motion linkage 45 is pivotable for reasons that will be described in greater detail below.

A connecting link 50 is pivotally attached to the rearward end 43 of the bellcrank 40 and extends transversely therefrom to a bracket 52 which is affixed to the right steerable wheel 19 to be pivotally movable therewith. One skilled in the art will readily realize that the connecting link 50 could be connected to other components of the steering mechanism 30 so that a pivotal movement of the bellcrank 40 can be effected whenever the steerable wheels 19 are moved relative to the steering axle 18. The purpose of the connecting link 50 being to effect pivotal movement of the bellcrank 40 about the first vertical pivot 36 in response to the pivotal movement of the steerable wheels 19 about the king pins 24.

In operation, the conventional operation of the steering control 15 causes a manipulation of the pressures within the hydraulic cylinder 25 to effect an extension of the cylinder rod 26 to the left as depicted in FIG. 6 causes a pivotal movement of the steerable wheels 19 about the respective king pins 24 in a manner substantially identical to that described above with respect to the prior art steering mechanism 20 depicted in FIGS. 1-3. Since the bracket 52 pivotally moves with the right steerable wheel 19 the pivoted motion of the bracket 52 causes a movement of the bellcrank 40 due to the connection therebetween by the connecting link 50. The rotation of the bellcrank 40 about the first pivot axis 36, as depicted in FIG. 6, causes the forward end 41 of the bellcrank 40 to move to the right of the longitudinal axis 23.

Because of the connection between the bellcrank 40 and the steering axle 18 by the lost motion linkage 45, the steering axle 18 is urged to the right with the forward end 41 of the bellcrank 40. Since the gear housing 22 attached to the steering axle 18 is pivoted about the second, vertical pivot 38, the steering axle 18 pivots about the second vertical pivot 38 in a clockwise direction, as shown in FIG. 6, which is the same direction of rotation of the steerable wheels 19. One skilled in the art will readily realize that operation of the steering mechanism 30 to cause a left turn will result in a movement of the components described above in the opposite direction, in substantially a mirror image to the exemplary depiction of FIG. 6.

Since the bellcrank 40 is pivotal about the first vertical pivot 36 while the steering axle 18 is pivotal about the second vertical pivot 38 which is spaced longitudinally rearwardly of the first vertical pivot 36, the forward end 41 of the bellcrank 40 travels about a different arcuate path than the corresponding portion of the steerable axle 18. The lost motion linkage 45 accommodates this difference in arcuate movement by the pivotal connection with the forward end 41 of the bellcrank 40 at the third vertical pivot 42, permitting relative motion between the bellcrank 40 and the lost motion linkage 45. Likewise, the pivotal connection between the transverse arms 46 and the brackets 47 attached to the steering axle 18 permit the lost motion linkage 45 to be rotated rearwardly about the transverse horizontal axis 49 while the bellcrank 40 and the steering axle 18 are pivoted about their respective pivot connections 36, 38. Accordingly, the lost motion linkage 45 permits the bellcrank 40 which is rotating about an arc having the first vertical pivot 36 as its center to effect pivotal movement of the steering axle 18 about a different arc having the center of rotation defined by the second vertical pivot 38. One skilled in the art will readily realize this arrangement of components will permit only a limited amount of movement for the steering axle 18.

The positioning of the first vertical pivot 36 intermediate the two ends 41,43 of the bellcrank 40, but closer to the forward end 41, while rotating the steering axle 18 about a pivot arm considerably longer than the pivot arm of the bellcrank 40, permits a ratio of movement of the pivoted steerable wheels 19 to be in the range of 5-10 times greater than the angular movement of the steering axle 18 about the second pivot 38. For example, a pivoting of the right steerable wheel 19 in a right turn for the tractor T through an angular movement of approximately 50 degrees may only result in approximately 6-8 degrees of angular movement of the steering axle 18 about the second vertical pivot 38.

By moving the steering axle 18 forwardly from the position shown in FIGS. 1-3, the additional rotative movement of the steering axle 18 positions the inboard end of the left hand tire forwardly of the chassis 10 to eliminate interference therewith during a right hand turn. The placement of the second pivot 38 along the longitudinal axis 23 substantially perpendicular to the inboard end of the right hand tire when turning the tractor T in a right turn, maintains the inboard end of the right hand steerable wheel 19 at substantially the same distance from chassis 10, as this portion of the right steerable wheel 19 moves substantially perpendicularly to the longitudinally axis 23 when the steering axle 18 is pivoted about the second pivot 38. The same relationship is true with the opposing wheels 19 during a left hand turn for the tractor T.

Since the steering axle 18 is supported from the support shaft 32 through the pivot support 34 and the support arm 37, enabling the steering axle is to rotate with the support shaft 32 relative to the chassis 10, changes in ground undulations will still cause the steering axle 18 to transversely oscillate about the longitudinal axis 23 irrespective of the orientation of the steering axle 18 relative to the chassis 10. Both the first and second vertical pivots 36,38 remain fixed relative to the chassis 10 and in alignment with the longitudinal pivot axis 23 throughout the pivotal movement of the steering axle 18.

Figure 7:
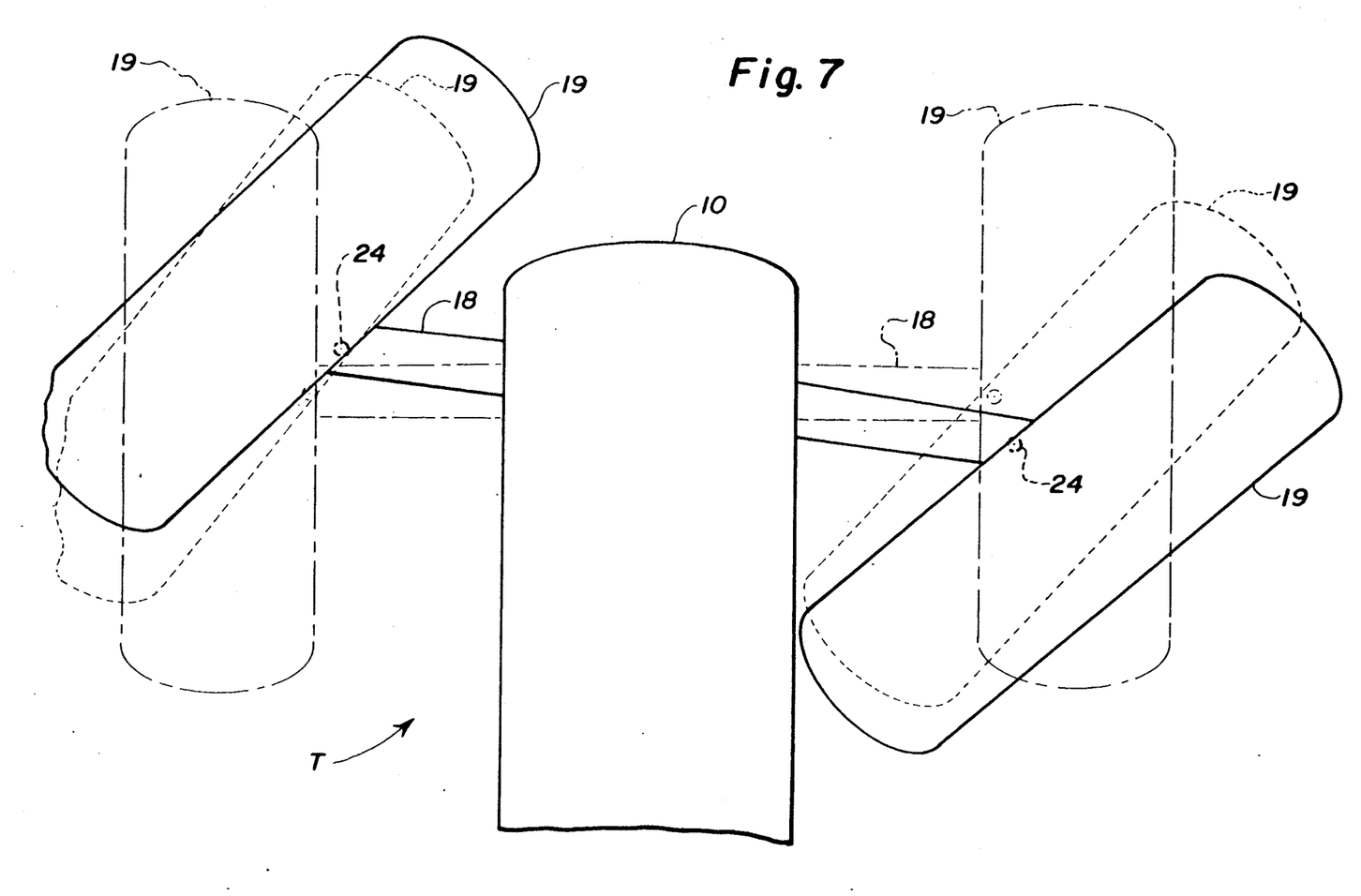
FIG. 7 is a schematic top plan view of the forward portion of a tractor to demonstrate the increased wheel turn accomplished by the steering mechanism incorporating the principles of the instant invention, the phantom lines depicting the steering axle and associated ground wheels oriented in a straight forward position, the dotted lines indicating the maximum turn of the steerable ground wheels permitted with prior art steering mechanism exemplified in FIGS. 1-3, and the solid lines indicating the maximum turn for the steerable ground engaging wheels as accomplished by the instant invention.
Figure 8:
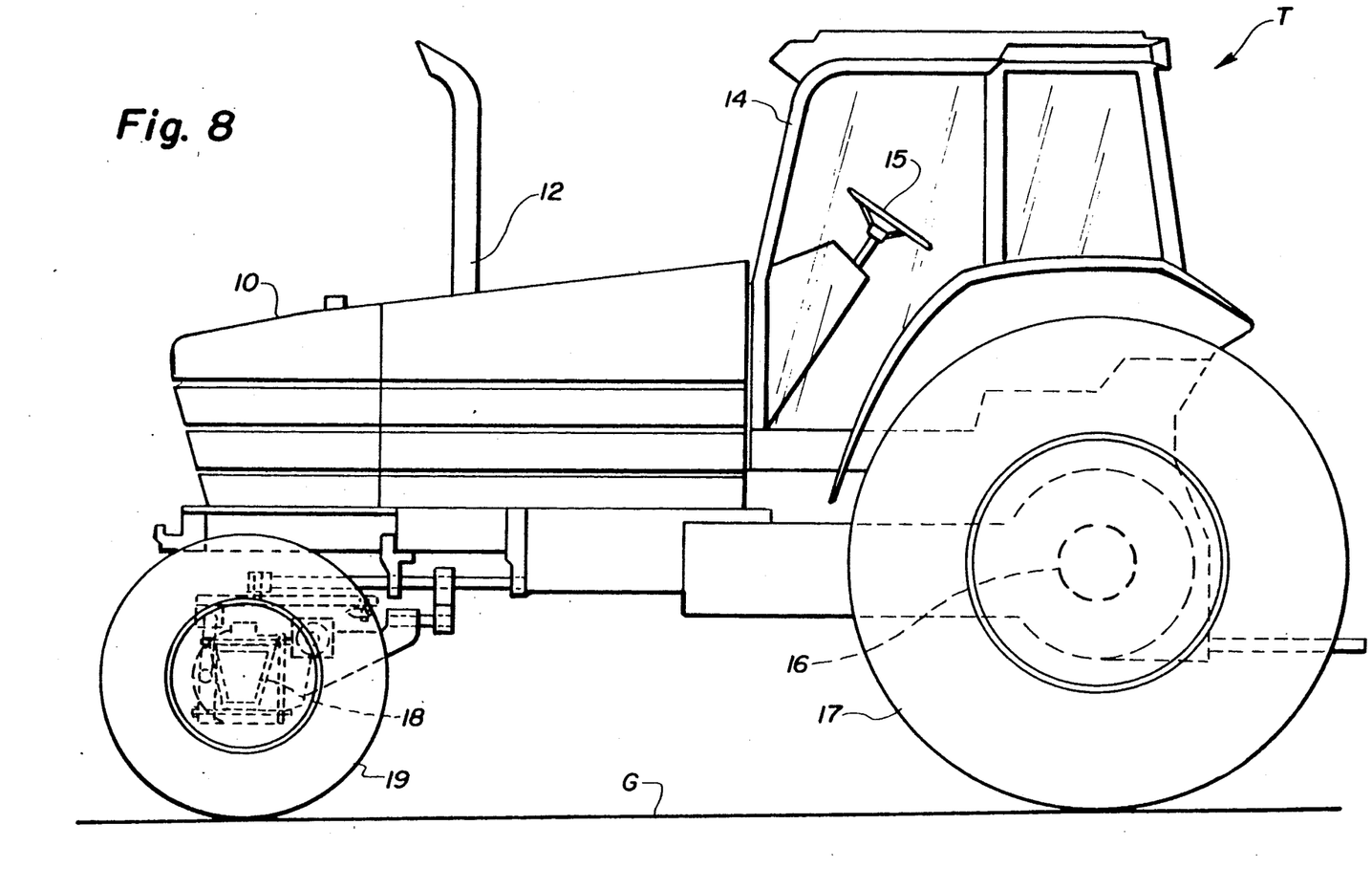
FIG. 8 is a schematic side elevational view of a tractor depicting a general relationship between the chassis, the rear fixed axle and the forward steering axle.

Referring now to the schematic view of FIG. 7, the advantages of the instant invention can be seen pictorially. Using the steerable wheels 19 mounted on the steering axle 18 in the straight forward position as shown in phantom lines FIG. 7 as the base reference point, the dotted outline of the steerable wheels 19 reflect the maximum turning ability, i.e. the minimum turning radius, for the tractor T with the prior art steering mechanism described in FIGS. 1-3. Utilizing the principles of the instant invention to simultaneously turn the steering axle 18 about the second pivot 38, as described above, positions the steerable wheels 19 in the position shown in solid lines in FIG. 7.

One skilled in the art will readily realize that a smaller turning radius for a giving wheel base length can be attained through utilization of the instant invention. Placement of the steering axle 18 forwardly relative to the chassis 10 permits the tractor T to have a more comfortable ride characteristic and also positions the inboard end of the outside steerable wheel 19 forwardly of the chassis 10 to prevent interference between. As also demonstrated in FIG. 7, the inboard end of the inside wheel 19 in a respective turn for the tractor T substantially maintain the proximity thereof relative to the chassis 10 due to the location of the second vertical pivot 38. One skilled in the art will readily realize that a maintenance of the turning radius specification will permit the utilization of a longer wheel base, i.e. a movement of the steering axle 18 forwardly from the fixed axle 16 to provide better ride characteristics for tractor T.

One skilled in the art will readily realize that the steering actions of the steerable wheels 19 and the steering axle 18 could be accomplished sequentially rather than simultaneously. Although the preferred embodiment, as described above, utilizes simultaneous steering of the wheels 19 and axle 18 through a mechanical linkage, other hydraulic or electronic embodiments could be utilized to provide a sequential pivoting of the steering axle 18 after a given amount of pivotal movement of the steerable wheels 19. The preferred embodiment described above utilizes most of the existing prior art steering and axle components and requires only the addition of modest mechanical and minimum hydraulic complications to provide the improved steering mechanism.

It will be understood that changes in the details, materials, steps and arrangements of parts which have been described and illustrated to explain the nature of the invention will occur to and may be made by those skilled in the art upon reading of this disclosure within the principles and scope of the invention. The foregoing description illustrates the preferred embodiment of the invention; however, concepts, as based upon the description may be employed by other embodiments without departing from the scope of the invention. Accordingly, the following claims are intended to protect the invention broadly as well as in the specific form shown.

Having thus described the invention, what is claimed is:

1. A vehicle having a chassis including a longitudinally extending centerline and being supported above the ground by a pair of transversely extending axles, each of said axles having a pair of ground wheels rotatably mounted thereon for mobilely supporting said chassis above the ground, one of said axles constituting a steering axle on which said ground wheels are steerable by being pivotally supported by pivotal mounts located on opposite sides of said steering axle to permit a turning of said vehicle, said vehicle further having steering means operably connected with the ground wheels on said steering axle for selectively controlling the pivotal movement of said ground wheels relative to said steering axle, the improvement comprising:

said steering axle being pivotally connected to said chassis by pivot means for permitting pivotal movement of said steering axle relative to said chassis, said pivot means being operatively associated with said steering means such that a pivotal movement of said steerable wheels effects a corresponding pivotal movement of said steering axle such that one of said pivotal mounts is positioned closer to said chassis centerline than the other said steerable wheel when said steering axle is pivotally moved to effect a turning of said vehicle.

2. The vehicle of claim 1 wherein the pivotal movement of said steering axle is in the same direction as the pivotal movement of said steerable wheels and is effected simultaneously therewith by said pivot means.

3. The vehicle of claim 2 wherein said pivot means includes a bellcrank pivotally supported from a first pivot fixed relative to said chassis, said steering axle being connected to a first end of said bellcrank and being pivotally movable about a second pivot fixed relative to said chassis, said pivot means further including a connecting link interconnecting a remote second end of said bellcrank and said steering means to effect a pivotal movement of said bellcrank about said first pivot when said steering means is manipulated to effect a pivotal movement of said steerable wheels.

4. The vehicle of claim 3 wherein said first pivot is positioned intermediate said first and second ends of said bellcrank, the movement of said first end of said bellcrank about said first pivot effecting pivotal movement of said steering axle about said second pivot.

5. The vehicle of claim 4 wherein said pivot means further includes a lost motion linkage to accommodate the difference in arcuate movements of said first end of said bellcrank and said steering axle.

6. The vehicle of claim 5 wherein said lost motion linkage includes a linkage member pivotally connected to said steering axle for pivotal movement about a generally horizontally extending, transversely oriented axis and to said first end of said bellcrank for pivotal movement relative to said bellcrank about a generally vertical axis.

7. The vehicle of claim 6 wherein said steering axle is pivotally connected to said chassis for pivotal movement about a longitudinally extending, generally horizontal axis.

8. The vehicle of claim 7 wherein both said first and second pivots are aligned with said longitudinally extending, generally horizontal axis.

9. A method of steering a vehicle having a chassis mounted on a fixed axle having a pair of fixed ground wheels rotatably mounted thereon and on a steering axle having a pair of steerable ground wheels rotatably mounted thereon and pivotally supported by pivotal mounts located on opposite ends of said steering axle for movement about generally vertical axes, said vehicle having a longitudinally extending centerline positioned equidistantly between said steerable wheels when said steering axle is oriented perpendicularly to said vehicle centerline, said vehicle further having steering means operatively connected to said steerable wheels for selectively controlling the pivotal movement thereof, said steering axle having pivot means pivotally connecting said steering axle to said chassis, said pivot means including a connecting link connected with said steering means to effect pivotal movement of said steering axle in response to pivotal movements of said steerable wheels, comprising the steps of:

selectively manipulating the pivotal movement of said steerable wheels relative to said steering axle; and simultaneously with said manipulating step, pivotally moving said steering axle in the same direction as the pivotal movement of said steerable wheels such that one of said pivotal mounts is closer to said centerline than the other said steerable wheel during said moving step while said steering axle is positioned in a non-perpendicular orientation relative to said centerline.

10. The method of claim 9 wherein the angular rotation of the pivotal movement of said steerable wheels is greater than the angular rotation of the corresponding pivotal movement of said steering axle.

11. The method of claim 10 wherein the pivotal movement of said steering axle is accomplished through a bellcrank connected at one end to said steering axle and at the opposing end to said connecting link, said bellcrank being rotatable about a first pivot fixed relative to said chassis and positioned intermediate the ends of said bellcrank.

12. The method of claim 11 wherein the pivotal movement of said steering axle is about a second pivot fixed relative to said chassis and spaced longitudinally relative to said first pivot.

13. The method of claim 12 further comprising the step of:

accommodating the differences in arcuate motion of said bellcrank and of said steering axle by a lost motion linkage interconnecting said bellcrank and said steering axle.

14. A steering mechanism for a tractor including a chassis mounted on a fixed axle having a pair of fixed ground wheels rotatably mounted thereon and on a steering axle having a pair of steerable ground wheels rotatably mounted thereon and pivotally supported for movement about generally vertical axes relative to said steering axle, said steering axle having a transversely extending axis intersecting both said steerable wheels, comprising:

steering means operatively connected to said steerable ground wheels for selectively controlling the pivotal movement of said steerable wheels relative to said steering axle;

pivot means pivotally supporting said steering axle from said chassis such that said steering axle is pivotable about a generally vertical pivot axis, said pivot axis being positioned longitudinally, with respect to a centerline of the vehicle, of said transverse axis of said steering axle; and connecting means operatively interconnecting said pivot means and said steering means to effect a pivotal movement of said steering axle in response to the pivotal movement of said steerable ground wheels relative to said steering axle.

15. The tractor of claim 14 wherein said pivot means includes a bellcrank having a first end operatively connected to said steering axle, a remote second end connected to said connecting means, and a first pivot positioned intermediate said first and second ends, said first pivot being fixed relative to said chassis.

16. The tractor of claim 15 wherein said pivot means further includes a second pivot fixed relative to said chassis about which said steering axle is pivotally movable, said second pivot being spaced longitudinally from said first pivot.

17. The tractor of claim 16 wherein said steering axle is pivotable about a generally horizontal, longitudinal axis defined by a fore-and-aft extending member carried by said chassis, said member supporting said first and second pivot in alignment with said longitudinal axis.

18. The tractor of claim 17 wherein said pivot means further includes a lost motion linkage interconnecting said first end of said bellcrank and said steering axle to accommodate the differences in the arcuate movements of said bellcrank and said steering axle about their respective pivots.

19. The tractor of claim 18 wherein said lost motion linkage includes a linkage member pivotally connected to said steering axle for pivotal movement about a generally transverse, horizontal pivot axis and pivotally connected to said bellcrank for pivotal movement about a generally vertical axis.

20. The tractor of claim 19 wherein said first pivot is positioned closer to said first end than to said second end so that the angular rotation of pivotal movement of said steering axle is less than the angular rotation of pivotal movement of said steerable ground wheels.

21. A vehicle having a chassis defining a longitudinally extending centerline and being supported above the ground by a pair of transversely extending axles, each of said axles having a pair of ground wheels rotatably mounted thereon for mobilely supporting said chassis above the ground, one of said axles constituting a steering axle on which said ground wheels are steerable by being pivotally supported from said steering axle to permit a turning of said vehicle, said vehicle further having steering means operably connected with the steerable ground wheels on said steering axle for selectively controlling the pivotal movement of said steerable ground wheels relative to said steering axle, the improvement comprising:

said steering axle being mounted for steering movement relative to said chassis such that a steering movement of said steering axis effects a turning of said vehicle independently of the pivotal movement of said steerable ground wheels relative to said steering axle, said steering axle being laterally shifted during said steering movement such that one of said steerable wheels becomes closer to said chassis centerline than the other of said steerable wheels.

22. The vehicle of claim 21 wherein said steerable movement of said steering axle is operatively associated with the pivotal movement of said steerable ground wheels relative to said steering axle to effect the turning movements of said vehicle.

23. The vehicle of claim 22 wherein the pivotal movement of said steerable ground wheels is effected simultaneously with the steering movement of said steering axle relative to said chassis.

24. The vehicle of claim 23 wherein said steering axle is pivotally supported from said chassis by a pivot means for permitting pivotal movement of said steering axle about a generally vertical axis.

25. The vehicle of claim 24 wherein said pivot means includes a bellcrank pivotally supported from a first pivot fixed relative to said chassis, said steering axle being connected to a first end of said bellcrank and being pivotally movable about a second pivot fixed relative to said chassis, said pivot means further including a connecting link interconnecting a remote second end of said bellcrank and said steering means to effect a pivotal movement of said bellcrank about said first pivot to turn said steering axle in the same direction as the pivotal movement of said steerable wheels when said steering means is manipulated to effect a pivotal movement of said steerable wheels.

26. A method of steering a vehicle having a chassis mounted on a fixed axle having a pair of fixed ground wheels rotatably mounted thereon and on a steering axle having a pair of steerable ground wheels rotatably mounted thereon and pivotally supported for movement about generally vertical axes relative to said steering axle, said chassis having a longitudinally extending centerline located such that said fixed wheels and said steerable wheels, respectively, are equidistantly positioned on opposite sides thereof, said vehicle further having steering means operatively connected to said steerable wheels for selectively controlling the pivotal movement thereof, said steering axle having pivot means including a connecting link connected with said steering means to effect pivotal movement of said steering axle in response to pivotal movements of said steerable wheels, comprising the steps of:

selectively manipulating the pivotal movement of said steerable wheels relative to said steering axle; and turning said steering axle in the same direction as the pivotal movement of said steerable wheels; and simultaneously with said turning step, transversely shifting said steering axle relative to said chassis centerline.

27. The method of claim 26 wherein said manipulating step and said turning step are accomplished simultaneously to effect a turning of said vehicle.

28. The method of claim 27 wherein said turning step includes the step of:

pivoting said steering axle about a first generally vertical axis.

29. The method of claim 28 wherein said steering axle is connected to a bellcrank operable to effect pivotal movement of said steering axis in response to the pivotal movement of said steerable wheels, said bellcrank being pivotable about a second generally vertical axis spaced relative to said first axis such that the end of said bellcrank operably connected to said steering axle moves along an arcuate path different from an arcuate path along which the corresponding connection point on said steering axle moves, further comprising the step of:

accommodating the differences in arcuate motion of said bellcrank and of said steering axle by a lost motion linkage interconnecting said bellcrank and said steering axle.

* * * * *